United States Patent

Wehner

[15] 3,636,562

[45] Jan. 18, 1972

[54] HIGH-RANGE RESOLUTION RADAR TARGET MATCHED FILTER

[72] Inventor: Donald R. Wehner, San Diego, Calif.

[73] Assignee: The United States of America as represented by the Secretary of the Navy

[22] Filed: Feb. 24, 1970

[21] Appl. No.: 13,414

[52] U.S. Cl. .................................. 343/5 SA, 343/17.1 R
[51] Int. Cl. ............................................. G01s 9/02
[58] Field of Search ............................ 343/5 SA, 17.1

[56] References Cited

UNITED STATES PATENTS

| | | | |
|---|---|---|---|
| 3,550,125 | 12/1970 | Fierston et al. | 343/17.1 R |
| 3,321,759 | 5/1967 | Freedman | 343/5 SA |
| 3,523,292 | 8/1970 | DeLorenzo | 343/5 SA |
| 3,349,395 | 10/1967 | Carre et al. | 343/17.1 |
| 3,391,403 | 7/1968 | Phillips, Jr. | 343/17.1 X |

*Primary Examiner*—Malcolm F. Hubler
*Attorney*—R. S. Sciascia, George J. Rubens and J. W. McLaren

[57] ABSTRACT

A radar target matched filter for improving target recognition and identification capabilities of high-range resolution radar systems. The filter comprises a microwave delay line having a plurality of adjustable energy coupling taps distributed along the delay line and set at selectively predetermined positions along the delay line corresponding to known scatter centers of a particular target. The tap outputs are combined such that the single dominant output which results will peak upon receiving reflected signals from targets for which the filter is matched.

2 Claims, 3 Drawing Figures

INVENTOR.
DONALD R. WEHNER
BY
George J. Rubens
ATTORNEYS 3,636,562

HIGH-RANGE RESOLUTION RADAR TARGET MATCHED FILTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

If conventional radar systems are used, radar backscatter from radar targets is equal to the vector sum of the phase and amplitude of the backscatter from the various individual scattering objects or centers on the target. The well-known scintillation phenomena is caused by variation of the phases of the individual echo signals as the aspect of the target changes slightly and also by modulation of the backscatter from individual scattering objects.

The advent of high-range resolution radar (range resolution less than several feet) makes it possible to resolve individual scatter centers on targets and to locate and measure modulation effects. The resulting correlation to the target geometry and reduced scintillation effect suggest high-range resolution radar as a means of classification and/or identification of uncooperative and cooperative targets to more effectively detect and identify the targets in high-clutter or noise environments.

Presently operational target identification techniques are not entirely radar functions, but rather require specially coded transponders located on friendly targets which respond to radar signals by transmitting identification codes which must be interpreted by the radar receiver. Furthermore, all presently operational techniques for detection, tracking, and identification operate with relatively low-bandwidth signals; that is, signals having pulse durations as long or longer than the targets illuminated.

High-range resolution radar is capable of resolving the numerous centers of radar backscatter (scatter centers) on a particular target. Accordingly by means of high-range resolution radar it is possible to increase the ability of radar to detect, track or identify targets for which there is certain a priori information relative to scatter centers associated with a particular target. Previous radars have not been capable of utilizing the scatter center position information inherent in many classes of targets. Thus it is necessary for effective identification of targets to provide means for algebraically adding radar returns from individual scatter centers on a single radar target to create a match to that target and a mismatch to jamming signals, clutter, or to other targets.

SUMMARY OF THE INVENTION

The invention comprises a radar target matched filter which can be utilized in high-range resolution radar systems to algebraically add the radar returns from the individual scatter centers on a particular radar target to create a match to that target and a mismatch to jamming signals, clutter, and to other targets. The matched filter comprises a microwave delay line having a plurality of adjustable energy coupling taps distributed along the delay line. The various taps are set to selectively predetermined positions along the delay line corresponding to the known scatter centers of a particular target. The tapped outputs corresponding to the various scatter centers are algebraically combined by means of a microwave power combiner to produce a single dominant output which will peak upon receiving reflected signals from the particular target for which the filter is matched.

STATEMENT OF THE OBJECTS OF THE INVENTION

An object of the present invention is to provide a radar target matched filter for use in high-range resolution radar systems.

Another object of the present invention is to provide a radar target matched filter comprising a novel microwave tapped delay line having energy coupling taps set to selectively predetermined positions along said delay line corresponding to known target scatter centers.

Another object of the present invention is to provide a radar target matched filter capable of increasing the ability of a radar system to detect, track or identify targets for which there is a certain a priori information.

Other objects and many of the attendant advantages of this invention will be readily appreciated as the same become better understood by reference to the following detailed description when considered in connection with the accompanying drawings.

DESCRIPTION OF THE PRINCIPAL EMBODIMENT

Figure 1:
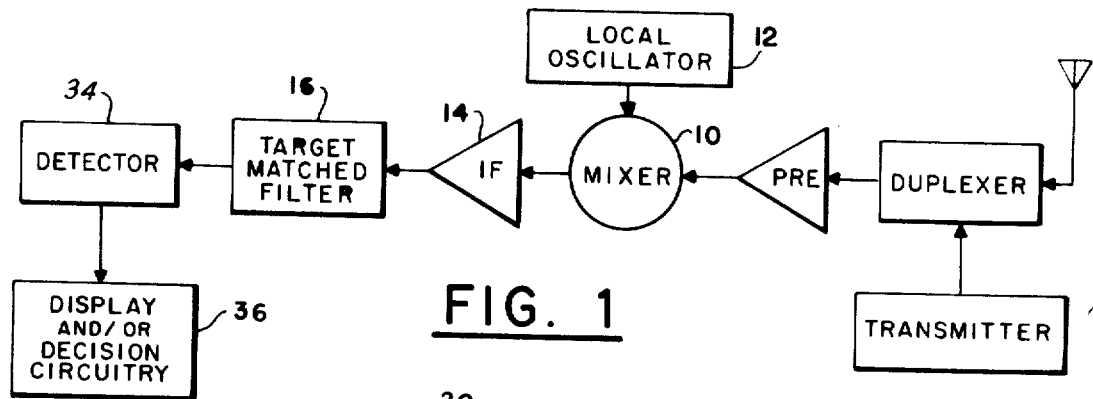
FIG. 1 is a schematic block diagram of a radar system incorporating the target matched filter of the present invention.

The essential elements of the radar receiver of FIG. 1 are those of a conventional range measuring system wherein a received signal is beat down in a mixer 10 by a local oscillator 12 and the reduced frequency is amplified in an IF-amplifier 14. The IF-amplifier frequency must be high enough to contain the radar bandwidth. Normally the output of the amplifier is supplied to a detector, however in FIG. 1 the output of the amplifier 14 is coupled directly into the novel target matched filter 16 which is the subject of the present invention. The output of the matched filter 16 is connected to a conventional microwave detector means 34. Display and/or decision circuitry 36 are connected to the detector means 34.

The matched filter 16 can consist of, for example, a circuit board 18 having superimposed and rigidly mounted thereon a microwave delay line 20. The output of the IF-amplifier 14 is coupled directly to transmission line 20 at the input terminal 22. Also supported on circuit board 18 and arranged and disposed in a coupling relationship with respect to the tapped delay line 20 are a plurality of slidable backward-wave couplers 24 (quarter-wave directional couplers). The delay line 20 is terminated by a resistance 26 equal to the characteristic impedance of the line 20 at the operating frequency to prevent reflection from the end of the line.

For the sake of clarity only a limited portion of the delay line and number of the slidable couplers are shown. It should be noted that each rectangular-shaped section of the delay line 20 has associated therewith a directional coupler 24 which is slidably adjustable along the vertical dimensions of the section.

The RF energy coupled from the delay line 20 by the energy couplers or taps 24 is applied by means of electrical cables 28 to the input terminals 30 of a microwave power combiner 32. The power combiner 32 is a conventional item such as, for example, an eight-way power divider, model 40350 manufactured by Anaren, Inc., Syracuse, N.Y.

The output of the microwave combiner 32 is coupled directly to a conventional radar detector 34 which then feeds the resulting output to a display and/or decision circuitry 36.

Figure 2:
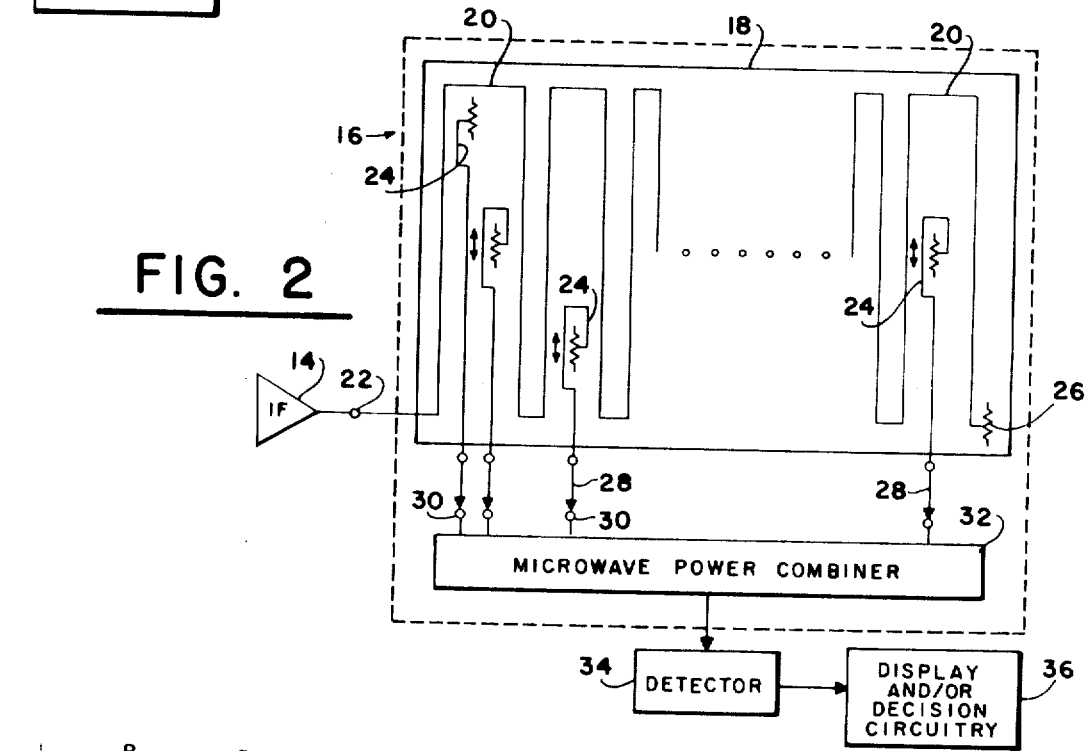
FIG. 2 is a schematic of the target matched filter of the present invention.

The target matched filter of FIG. 2 can be constructed by means of so-called strip-line or microstrip techniques, and the delay line section can be made of any TEM-mode microwave transmission line. The couplers 24 can be any of several well-known directional types which directionally couple to the type of delay line being used.

In operation the radar system of FIG. 1 transmits linear FM (chirp) signals thereby illuminating a target with pulses of microwave energy of predetermined bandwidth. If an RF energy pulse hits a target having four individual scatter centers located thereon, the echo signal or signature will resemble the waveform shown in FIG. 3a wherein the RF pulses $P_1$, $P_2$, $P_3$, and $P_4$ represent the returns or responses from four individual scatter centers located on a single target. The response pulses are received throughout a band of frequencies within said predetermined bandwidth.

The taps or energy couplers 24 distributed along the delay line 20 are correlated to the echo signal or pulse from the particular target when the amount of delay between the various taps is set in the time inverse function of the echo waveform. Therefore, if $f(t)$ is the echo waveform time function $$F(t)=f(-t)$$

where $f(-t)$ is the inverse time function of the waveform, and where $F(t)$ is the delay function of the tapped delay line.

For $N$ scatter centers, $N$ taps are thus spaced apart with respect to each other in such a manner that starting at the input to the delay line, $$d_1 = t_N$$
$$d_2 = t_{N-1}$$
$$d_3 = t_{N-2}$$
$$\vdots$$
$$d_N = t_1$$

where $t_n(N=1....N)$ is the time delay between responses from scatter centers measured from the beginning of the echo waveform, and where $d_n(n=1....N)$ is the time delay between the tap settings along the delay line starting at the input to the delay line.

Figure 3:
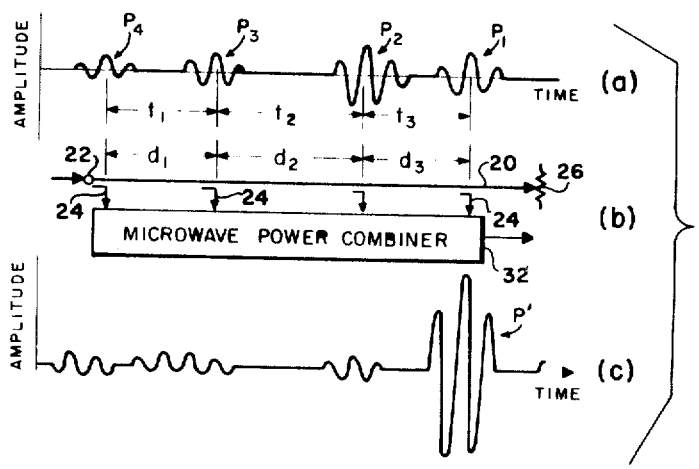
FIG. 3(a) represents a typical echo signature waveform consisting of the return pulses from the individual scatter centers on a target before the signature waveform is detected.
FIG. 3(b) is a simplified schematic representation of the tapped microwave delay line of the present invention.
FIG. 3(c) represents the output waveform derived by processing the return pulses of FIG. 3(a) through the microwave delay line and the power combiner of FIG. 3(b).

For example in FIG. 3a responses $P_1$, $P_2$, $P_3$, and $P_4$ from four target scatter centers on a particular target are separated by $t_1$, $t_2$, and $t_3$, respectively.

The tapped delay line matched filter 16 is shown in simplified form in FIG. 3b as being represented by a straight transmission line 20. The four taps 24 are properly set for a match to the particular target having four scatter centers when $$d_1 = t_1$$
$$d_2 = t_2$$
$$d_3 = t_3$$

The overall response produced at the output of the power combiner 32 is shown in FIG. 3c. As can be seen, the response consists of a large RF pulse P' whose amplitude is equal to the algebraic sum of the amplitudes of $P_1$, $P_2$, $P_3$, and $P_4$. The response P' also includes a number of smaller time sidelobes. It should be noted that any other target having differently spaced scatter centers will not match to the filter to thus produce the single response waveform P' which is characteristic of the target which produced the return pulses $P_1$, $P_2$, $P_3$, and $P_4$. The resultant waveform obtained at the output of the microwave power combiner 32 is then applied directly to a conventional radar detector 34.

By thus superimposing the various scatter center returns from a single target, a matched response characteristic of the particular target under investigation and of that target only is achieved. The resultant signal lends itself much more readily to detection and display and/or decision processing than the signature itself. It can readily be appreciated that without the novel invention, it would be necessary to separately analyze the four pulses $P_1$, $P_2$, $P_3$, and $P_4$ which comprise the signature of FIG. 3a. By means of the novel invention only one waveform which is the algebraic sum of the various scatter center return pulses need be processed and analyzed.

In essence the invention creates a matched condition relative to the particular target under investigation and also presents a mismatch condition to jamming signals and clutter or to other targets.

Obviously many modifications and variations of the present invention are possible in the light of the above teachings. It is therefore to be understood that within the scope of the appended claims the invention may be practiced otherwise than as specifically described.

What is claimed is:

1. The method of identifying a remote target comprising the steps of:
    illuminating a target to be identified with RF pulses of microwave energy of predetermined bandwidth;
    receiving an echo signal from said target throughout a band of frequencies within said predetermined bandwidth;
    said echo signal consisting of a plurality of discrete RF pulses, each of said discrete RF pulses corresponding to the energy reflected from a scatter center of said target to be identified;
    channeling said echo signal along a number of different delay paths of a common microwave delay line, said number being equal to the number of said scatter centers;
    extracting said echo signal at the end of each of said delay paths;
    combining to obtain a time-correlated RF pulse having a maximum amplitude substantially equal to the algebraic sum of the maximum amplitudes of said plurality of discrete RF pulses in said echo signal.

2. A system for identifying remote targets comprising:
    means for illuminating said target with RF pulses of microwave energy;
    means for receiving echo signal from said target;
    said echo signal consisting of a plurality of discrete time-displaced pulses, each of said pulses corresponding to the energy reflected from a scatter center of said target;
    a delay line coupled at one end thereof to the output of said receiver means and connected at the other end thereof to a terminating resistance to prevent standing or traveling waves along said delay line;
    means for channeling said echo signal along a different path on said delay line;
    said means including a plurality of selectively adjustable microwave energy coupling taps distributed along said delay line;
    the length of each of said paths being a function of the time delay required to enable the discrete time-displaced pulses to be superimposed upon each other in a time-correlated manner to provide a composite pulse having a maximum amplitude substantially equal to the algebraic sum of the amplitudes of said discrete, time-displaced pulses;
    means for combining the amplitudes of said discrete pulses to obtain said composite pulse; and,
    means for detecting said composite pulse.

* * * * *